Nov. 23, 1971     D. E. GLADOW ET AL     3,621,726

PRESSURE GAUGES

Filed April 22, 1970     5 Sheets-Sheet 1

INVENTORS
DEAN E. GLADOW
DONALD F. WILKES

BY Burns, Doane, Benedict,
Swecker & Mathis

ATTORNEYS

Nov. 23, 1971 D. E. GLADOW ET AL 3,621,726
PRESSURE GAUGES
Filed April 22, 1970 5 Sheets-Sheet 5

INVENTORS
DEAN E. GLADOW
DONALD F. WILKES

BY Burns, Doane, Benedict,
Swecker & Mathis
ATTORNEYS

Nov. 23, 1971  D. E. GLADOW ET AL  3,621,726
PRESSURE GAUGES

Filed April 22, 1970  5 Sheets-Sheet 4

INVENTORS
DEAN E. GLADOW
DONALD F. WILKES

BY Burns, Doane, Benedict,
Swecker & Mathis
ATTORNEYS

United States Patent Office 3,621,726
Patented Nov. 23, 1971

3,621,726
PRESSURE GAUGES
Dean E. Gladow and Donald F. Wilkes, Albuquerque, N. Mex., assignors to Rolamite, Incorporated, San Francisco, Calif.
Filed Apr. 22, 1970, Ser. No. 30,671
Int. Cl. F16h 27/02
U.S. Cl. 74—89.2
33 Claims

ABSTRACT OF THE DISCLOSURE

A movement for meters and gauges. A roller provides the output motion for a pointer. The roller is supported for movement along a guide surface on an actuating member. A band encircles the roller and the actuating member for holding the roller against the guide surface while allowing the roller to roll along the surface. A portion of the band is wrapped on the roller and extends outwardly from the roller to a fixed support. The actuating member rotates about an axis spaced from the guide surface and motion is transmitted from the input member, which may be a Bourdon tube, by an arm extending outwardly from the actuating member. Upon rotation of the actuating member about its axis by the input member, the roller rolls along the guide surface, causing the pointer to follow approximately a circular path.

BACKGROUND OF THE INVENTION

This invention relates to movements for gauges and meters, and more particularly to movements for Bourdon tube pressure gauges.

A conventional Bourdon tube pressure gauge has a pointer mounted on a shaft for rotation about a fixed axis. A pinion gear on the shaft is driven by a pivoting sector gear. A linkage connects the sector gear with the movable end of the Bourdon tube. As the tube expands, the motion of the end of the tube is transmitted to the sector gear through the linkage, causing the sector gear to pivot and to rotate the pointer shaft. Usually a hair spring is connected with the pointer shaft to prevent backlash in the gearing.

The sector and pinion type movement for Bourdon tube pressure gauges necessary includes a large number of parts that are assembled by hand. This makes the assembly operation expensive. Also, since the motion of the sector gear is amplified through the pinion gear, the largest amplification results when the ratio of the pitch diameters of the sector gear and pinion gear is the maximum. If the pinion gear has a small diameter, it is difficult to machine the teeth on the gear and dimensional inaccuracies in the gearing cause improper meshing of the gears and irregular movement of the pointer.

Another disadvantage of conventional meter movements is the friction generated in the gearing and at the bearings for the pointer shaft. There is also some lost motion in the linkage. Frictional resistance in pressure gauge movements is so common that engineers and other persons who regularly read pressures by means of these gauges have a practice of tapping the gauge crystal to overcome internal friction and allow the pointer to move to its proper position.

Attempts have been made to substitute a tape or band connection between the sector and the pointer shaft in order to overcome the disadvantages of gearing. An example of a tape drive is disclosed in Gorgens et al. Pat. No. 3,204,472. In the meter movement disclosed in this patent, there are a large number of parts that apparently must be assembled by hand and the pivotal mounting of the sector arm of the pointer shaft is subject to wear. Also, a small diameter output shaft is required and the degree of amplification that can be achieved by the meter movement of the Gorgens et al. patent is not much greater than that of a sector and pinion movement.

SUMMARY OF THE INVENTION

Accordingly, it is an object of this invention to provide an improved mechanism for transmitting and ampliffing a non-rotary input motion to a rotary output motion.

It is a further object of this invention to provide a gauge or meter movement that has relatively few separate parts and which can be assembled efficiently and economically.

Another object of this invention is to provide a gauge or meter movement in which wear of the components is minimized.

A still further object of this invention is to provide a gauge or meter movement in which a high degree of amplification is obtained.

It is also an object of this invention to provide a gauge or meter movement in which not only the zeroing position of the pointer of the scale is adjustable, but also the degree of amplification and linearity of movement of the pointer across the scale are adjustable.

These objects are accomplished in accordance with several preferred embodiments of the invention by a gauge or meter movement that employs a guide surface on which a roller is mounted. The roller is held against the guide surface by a thin resiliently flexible control band wrapped on the surface of the roller drive section and attached to the guide surface, so that the roller is capable of rolling along the guide surface. The roller includes a substantially cylindrical drive section that has a different diameter from that on which the roller rolls along the guide surface. The band extends outwardly from the roller along the guide surface and a tongue on the band is attached to an input element that is capable of displacing the tongue generally longitudinally of the path of the roller. A pointer is mounted on the end of the roller and extends radially outward and displacement of the band tongue relative to the guide surface causes the roller to roll along the guide surface. The differential between the diameter of the roller drive section and the diameter on which the roller rolls along the guide surface causes the motion of the roller to be amplified with respect to the displacement of the band.

In one preferred embodiment of the invention, the guide surface is provided on a rocker element that is pivoted about an axis that is parallel to the axis of the roller. The band tongue is fixed relative to the pivot axis and input motion is applied to the rocker, causing the rocker to pivot about its axis, thereby applying tension to the band tongue causing the roller to roll along the guide surface. The guide surface is substantially cylindrical. The path of the end of the pointer is substantially circular and the arc through which the pointer moves for equal increments of input motion is substantially uniform along substantially the entire path of the pointer.

In another preferred embodiment, the rocker and the roller cooperate with the band tongue, so that both move in opposite directions and the resultant displacement of the roller relative to the meter case is minimized. Accordingly, the base of the pointer remains close to the center of the meter dial, as the end of the pointer swings around the scale.

In a third embodiment of the invention, the guide surface is fixed with respect to the roller, and the band tongue is connected directly to the input means. Thus, displacement of the input means pulls the band tongue and causes the roller to roll along the guide surface.

DETAILED DESCRIPTION OF THE DRAWINGS

These preferred embodiments are illustrated in the accompanying drawings in which.

DESCRIPTION OF PREFERRED EMBODIMENTS

Figures 1, 2, 3:
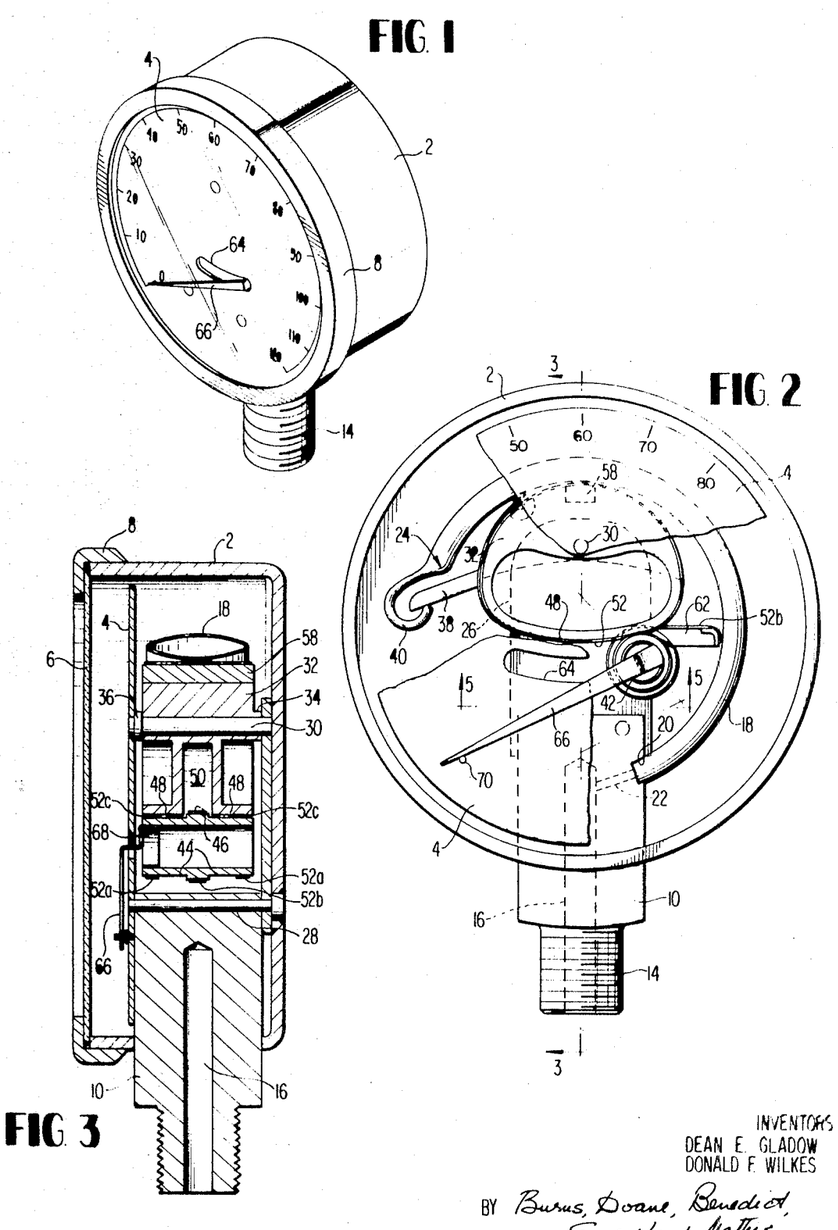
FIG. 1 is a perspective view of a pressure gauge incorporating the meter movement of this invention according to one embodiment.
FIG. 2 is a front elevational view of the pressure gauge, partially in cross section.
FIG. 3 is a cross-sectional view of the pressure gauge along the line 3—3 in FIG. 2.

A pressure gauge incorporating the meter movement of this invention is illustrated in FIG. 1. The pressure gauge includes a case 2, a circular dial plate 4 and a transparent crystal 6 which is secured on the case by a ring 8.

A base 10 projects through an opening 12 (FIG. 4) in the case 2. The base 10 has a threaded shank 14 for connecting the gauge with a source of pressure to be measured. The base 10 includes an internal bore 16 for conducting pressure to a Bourdon tube 18 which is secured in a groove 20. A passage 22 communicates between the bore 16 and the bottom of the groove 20 and is aligned with the interior of the tube 18. The tube may be secured in the groove by soldering or other suitable means that provides a secure mounting for the tube and effectively seals the joint between the tube and the base 10.

When it is not expanded, the tube 18 is approximately circular, as shown in FIG. 2, and extends through an arc of more than 180°. When the fluid pressure in the interior of the tube 18 increases, the tube expands and tends to straighten out. The degree of expansion is proportional to the pressure in the tube. Since the lower end is fixed in the base 10, the maximum displacement occurs at the free end of the tube, indicated generally at 24, in response to pressure changes in the tube 18. In most pressure gauges of this type, the free end of the tube moves in an almost tangential direction with respect to the arc of curvature of the tube, during expansion or contraction of the tube.

A mounting plate 26 is secured on the base 10 by a pair of rivets 28 which extend through the back of the case 2, through the base 10 and through the dial plate 4. The mounting plate 26 and the dial plate 4 are supported on the base 10 in substantially parallel relation, as shown in FIG. 3. A pivot shaft 30 extends through the back of the case and is secured on and supported by the mounting plate 26 and the dial plate 4. A rocker 32 is mounted for pivoting movement on the shaft 30 and includes a boss 34 which bears against the mounting plate 26. A flange 36 on the shaft 30 maintains the proper spacing between the dial plate 4 and the rocker 32.

The rocker has an arm 38 which extends generally radially with respect to the pivot shaft 30. The free end of the tube 18 has a hook 40 formed integrally with the tube. The lower surface of the arm 38, as viewed in FIG. 2, bears against the end of the hook 40. Since the Bourdon tube end portion 24 moves generally tangentially to the curvature of the tube 18, and the arm 38 swings about the shaft 30, there is very little sliding motion between the arm 38 and the hook portion 40. As the tube expands, the upward motion of the end portion is transmitted to the rocker 32, causing the rocker to swing clockwise, as viewed in FIG. 2. Upon contraction of the tube 18 from an expanded condition, the downward movement of the hook portion 40 allows the arm 38 to swing in a counterclockwise direction to the initial position. The motion of the rocker 32 is transmitted to a roller 42 which moves in response to movement of the rocker 32. The roller 42 is preferably in the form of a hollow tube. The roller includes two rolling sections 44 separated by a drive section 46. The rocker 32 has corresponding guide surfaces 48 and a longitudinal groove 50 between the guide surfaces 48.

Figure 4:
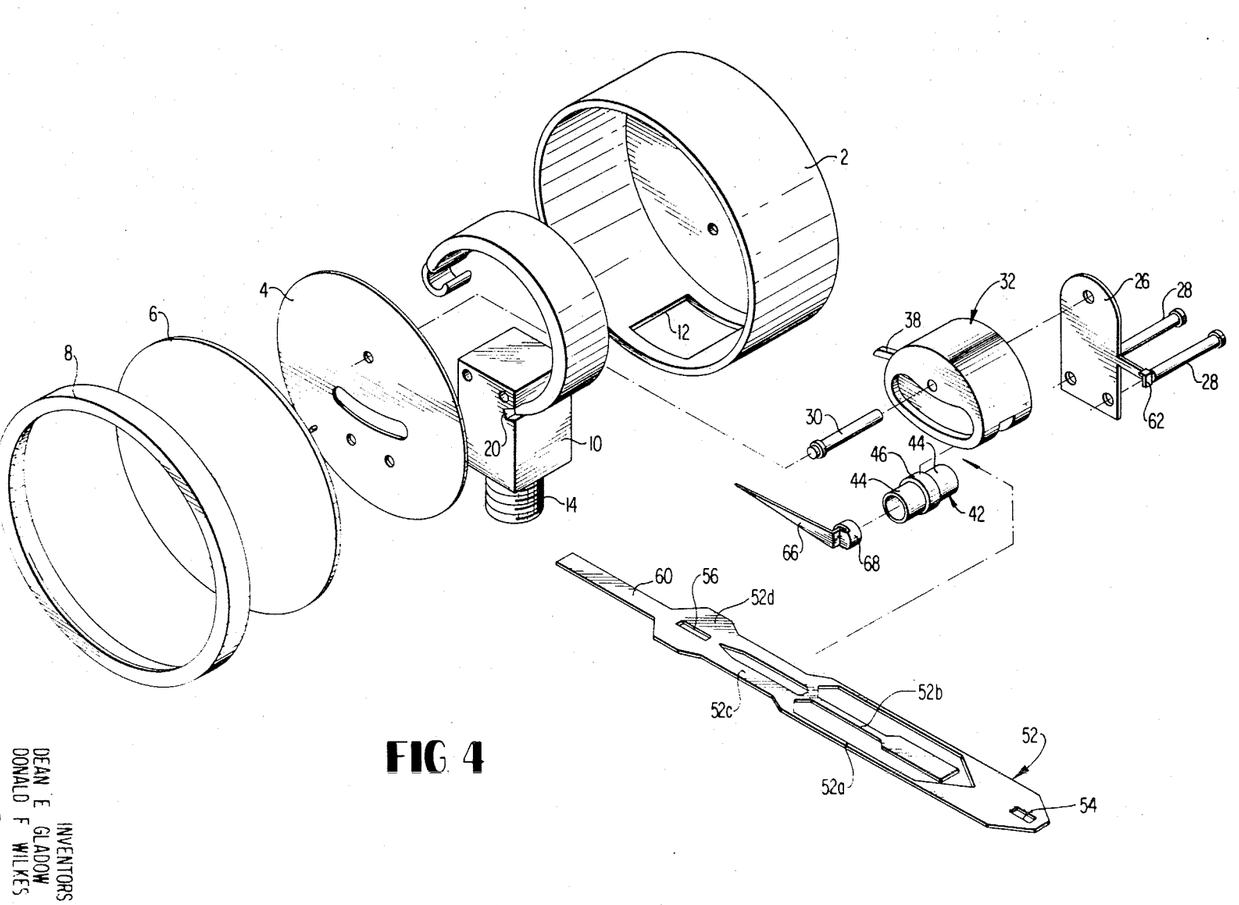
FIG. 4 is a perspective and exploded view of the pressure gauge, showing the components thereof.
Figure 5:
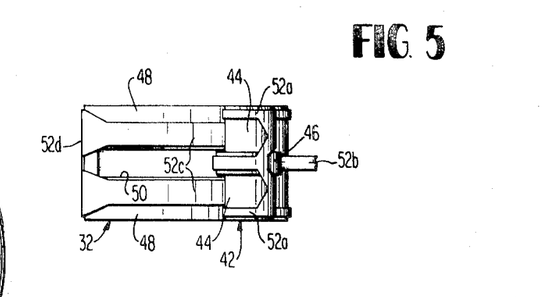
FIG. 5 is a cross-sectional view of the gauge along the line 5—5 in FIG. 2.

A band 52, as shown in FIG. 4, holds the roller 42 against the guide surface 48 of the rocker and transmits rotary motion between the rocker and the roller. The band includes a portion 52a which spans the full width of the band, but has a center cut out portion that separates a tongue 52b from the portion 52a. An intermediate portion 52c has a longitudinal slot extending along its length and the width of the intermediate portion 52c is less than the width of the cut out portion of the band 52a. Another portion 52d has substantially the same width as the portion 52a. The band 52 is wrapped around the rocker and the roller in the shape of a figure 8 and the tongue 52b is looped around the drive section 46 of the roller 42 and extends through the slot in the intermediate portion 52c, as shown in FIG. 5.

The portions 52a and 52d extend around the rocker in opposite directions and are provided with slots 52 and 56, respectively, through which the arm 38 extends. A tab 60 is provided at one end of the band. When the band is assembled over the roller and the rocker, the tab 58 can be cut off. The tab 60 overlaps the band portion 52a and is soldered or otherwise secured to the portion of the band between the slot 54 and the cut-out in the adjacent portion 52a. As shown in FIG. 5, the portion 52c is aligned with guide surfaces 48 on the rocker and partially wrapped on the roller, while the portion 52a encircles the roller surfaces 44. The transition between the portion 52b and 52c is on the roller and to prevent slippage, this transition portion may be secured to the roller by soldering or other suitable means. The tongue 52b extends around the drive section 46 of the roller and projects outwardly in a direction opposite to that of the intermediate portion 52c. A bracket 62 projects outwardly from the mounting plate 26 and the tongue 52b is secured to the bracket by soldering or other suitable means. Preferably, the band is also secured to the surface of the roller 42 by soldering at the junction between the intermediate portion 52c and the wider portion 52a.

The dial plate 4 has an arcuate slot 64. A pointer 66, which is supported on the roller 42, extends through the slot 64. The base of the pointer 66 has a collar 68 which is preferably integral with the pointer and is secured in the interior of the roller 42 by solder or an adhesive. A pin 70 projecting outwardly from the dial plate 4 holds the pointer at its initial position.

The dial plate 4 has a circular scale with graduations which are equally spaced apart around the circumference of the dial plate. As in conventional pressure gauges and similar instruments, it is usually desirable for the end of the pointer to move over the scale in a circular path and to move through the same arc for a given change in input condition at any portion of the scale. The movement of the pointer over the scale on the dial plate 4 is based on a geometric figure known generally as an epitrochoid. An epitrochoid is a figure scribed by the end of a radial pointer of a length greater or less than the radius of a roller on which it is secured, as the roller rolls along a cylindrical surface. By proper selection of the diameter of the roller and the radius of the guide surface on which it rolls, the path of the end of the pointer can be made to approximate an arc of a circle. The surface 48 of the rocker 32 corresponds generally to the cylindrical surface for producing an apitrochoid by the end of the pointer 66 as the roller 42 rolls along the surface.

The means that is provided for rolling the roller 42 along the guide surface 48 is the tongue 52b which is secured on the bracket 62. The tongue serves as a control band that applies torque to the roller tending to rotate the roller in a clockwise direction whenever clockwise pivoting of the rocker 32, as viewed in FIG. 2, applies tension to the tongue 52b. The displacement of the roller 42 along the surface 48 in response to a particular arc of motion of the rocker 32 is a function of the radial distance from the instantaneous center of rolling to the line of action of the tongue 52b. In other words, as the ratio of the radius of the drive section 46 to the radius of the rolling section 44 approaches unity, the displacement of the pointer 66 for the same arc of motion of the rocker 32 approaches infinity.

Figure 6:
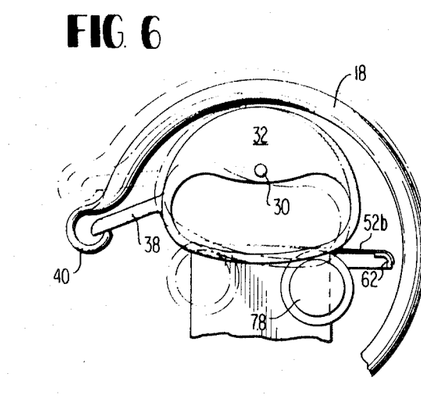
FIG. 6 is a schematic view of the gauge corresponding to FIG. 2 and showing the relative displacement between the rock, the roller, and the band.

As can be seen in FIGS. 2 and 6, the band tongue 52b is fixed on the bracket 62 and as the roller rolls toward the left, the point of tangency of the tongue relative to the center of rolling changes. The maximum displacement of the roller by the band for equal angular movement of the rocker occurs when the point of tangency of the tongue and the rolling center are in the same radial plane. As the roller 42 moves from the position shown in FIG. 2 toward the left, the point of tangency progressively moves from a position out of radial alignment to a position of radial alignment when the pointer is at about the middle of the scale. Further movement causes the point of tangency to move progressively out of radial alignment. Thus, maximum relative displacement occurs along the middle of the scale and minimum relative displacement occurs at opposite ends of the scale.

The rocker guide surface is substantially cylindrical and has a radius of curvature that is substantially greater than the shortest distance between the guide surface 48 and the pivot shaft 30 of the rocker. The portions of the guide surface 48 that are located at the opposite ends of the path of the roller 42 are spaced a greater distance from the pivot axis of the rocker than is the surface 48 at the mid-portion of the roller path. This arrangement produces a greater rate of displacement of the roller along its path at the opposite ends of the roller path than it does at the mid-portion of the roller path. The radius of curvature of the guide surface, the diameter of the drive section on the roller, the position of the pivot axis for the rocker and the position of the fixed end of the band tongue 52b are selected to compensate for variations in linearity, thereby providing substantially uniform changes in the position of the pointer for equal angular displacement of the rocker throughout the entire scale.

The band 52 is formed of a resiliently flexible material that is naturally flat. When the band is assembled on the roller and rocker, the band is flexed to assume the corresponding curved shape of the surfaces on which the band is supported. The resistance to flexing causes the roller 42 to be spaced away from the rocker surface 48. The spacing between these surfaces typically is very small, but it is sufficient to allow the roller to freely pass over dust or dirt particles that may be present on either the surface of the rocker 32 or the roller 42, or on the band 52.

Another important advantage of the use of the resiliently flexible band is that the band continuously urges the roller 42 and the rocker 32 to return to their respective initial positions. This is accomplished by forming the cutout portions of the band, so that the differences in resistance to flexing of the band along its length varies continuously urging the roller toward the right, as viewed in FIG. 2. The flexural bias of the band also urges the rocker 32 in a counterclockwise direction.

The rocker 32 has a counterweight 58 in the form of a metal insert. The counterweight compensates for the mass of the roller 42 and the lower portion of the rocker 32 which tend to move in the same direction in response to an impact applied toward the right or left against the side of the case 2, as viewed in FIG. 2. The inertia of the counterweight 52 counteracts the inertial effect of the roller 42 and the rocker 32, thereby stabilizing the meter movement.

In operation, when the shank 14 is connected to a source of fluid pressure and the pressure is increased in the tube, the tube 18 tends to straighten, causing the free end 24 to move upwardly and toward the left, as shown in dotted lines in FIG. 6. This motion is imparted to the arm 38, causing the rocker 32 to rotate clockwise, as viewed in FIGS. 2 and 6. The pivoting of the rocker tends to cause the roller 42 to move toward the left without rotating, but motion of the roller away from the bracket 62 is restricted by the tongue 52b. As a result, the roller is rotated and propelled by the band tongue 52b relative to the rocker surface 48 at the same time that the central axis of the roller is being displaced by swinging movement of the rocker about its shaft 30. Since the pointer 66 is secured on the roller, the pointer swings clockwise as the roller rolls along the surface 48. As long as the pressure in the tube 18 stays the same, the components are in their respective positions corresponding to the pressure. When the pressure in the tube decreases, the tube 18 contracts, and the hook 40 moves downwardly, allowing the arm 38 to swing the rocker counterclockwise to a position corresponding to the lower pressure. The roller 42 also moves toward the right as viewed in FIGS. 2 and 6 allowing the tongue 52b to wrap itself on the torque section 46 of the roller. Thus, the pointer 66 moves across the scale on the dial plate 4 in response to expansion and contraction of the tube 18.

In the preferred embodiment illustrated in FIGS. 1 to 6, the radius of the cylindrical surface 48 is about three times the radius of the rolling surfaces 44 and the length of the pointer 66 from the center of the roller 42 is about five times the diameter of the rolling surface 44. The resulting path of the end of the pointer is approximately a circle having a radius of about three and three quarters times the diameter of the small roller.

Various means of adjustment of the movement may be incorporated in the meter movement of this invention.

By bending the bracket 62 upward or downward with respect to its position shown in FIG. 6, the linearity of movement of the pointer across the scale can be adjusted. When the position of the fixed end of the tongue 52b is changed in this manner, the point of tangency of the tongue 52b on the roller 78 changes relative to the surface on which the roller 78 rolls. Displacement of the bracket 62 upwardly causes the amplification at the high end of the scale to be increased, relative to the amplification at the low end of the scale. Displacement of the bracket 62 in a downward direction produces the opposite effect. Thus, by moving the bracket 62 vertically, as viewed in FIG. 2, the position of the pointer can be made to correspond more closely to the actual pressure conditions in the Bourdon tube.

Another method of adjusting the meter movement is to bend the hook portion 82 on the Bourdon tube.

By bending the hook, the point of engagement between the end of the hook and the arm 38 can be moved along the undersurface of the arm 38 which extends radially from the pivot axis 30. The effect of this adjustment is to change the amplification. If the end of the hook 82 is moved outwardly along the arm 38, the amplification is increased, while moving the point of engagement of the hook inwardly decreases the amplification.

Adjustment of the zero position of the pointer on the scale can be made by bending the hook 82 so that it is displaced in a clockwise or counterclockwise direction with respect to the pivot axis 30. A zero adjustment can also be accomplished by changing the position of the pointer collar 68 in the roller 42.

Figure 7:
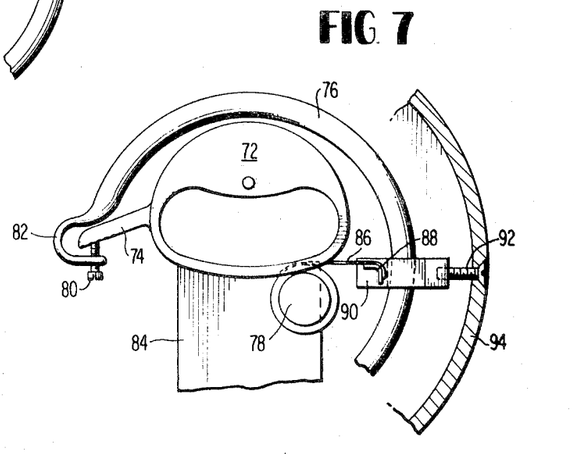
FIG. 7 is a detail elevational view of a modified form of the gauge showing an adjustment device for the control band and the arm.

In FIG. 7, a schematic view of a modified form of the gauge is shown. A rocker 72 of substantially the same structure as the rocker 32 in FIGS. 1 to 6, is shown schematically with an arm 74 that is connected with and movable by a Bourdon tube 76. A roller 78 corresponding to the roller 42 in FIGS. 1 to 6 is also shown schematically in FIG. 7. An adjustment screw 80 is threaded through a hole in the hook portion 82 of the tube 76. By turning the screw 80, the position of the arm relative to the tube can be adjusted. This adjustment changes the position of the rocker 72 relative to the mounting plate 84 and the pointer relative to the scale on the dial plate, and is useful for calibrating the gauge at a predetermined pressure applied to the interior of the tube 76.

FIG. 7 shows another modification of the meter movement according to FIGS. 1 to 6. The attachment of the tongue of the band has been modified. The tongue 86 is substantially identical to the tongue 52b of the band 52 which is shown and described with respect to FIGS. 1 to 6. Instead of the bracket 62 which is shown in FIG. 2, the end of the tongue 86 is secured to a cross bar 88 of a U-shaped bracket 90. A screw 92 extends through a hole in the case 94 and is threaded into a tapped hole in the bracket 90. By turning the screw 92 the band tongue 86 is drawn toward the right, as viewed in FIG. 7, thereby displacing the roller 84 along the surface of the rocker 82 to change the position of the pointer without rotating the rocker 72. This adjustment can be accomplished from the exterior of the case 94, without removing the meter movements. In FIG. 7, there are two means shown for adjusting the position of the pointer. Either of these adjustment means can be incorporated in a meter, since they operate independently, or both can be used together to provide greater flexibility in making adjustments.

Figure 8:
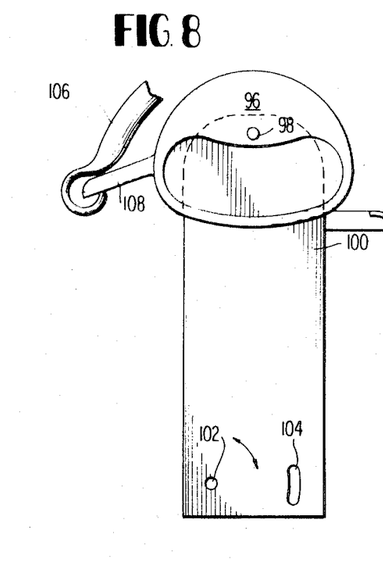
FIG. 8 is a detail elevational view of a second modified form of the gauge showing an adjustable mounting for the movement.

A second modified form of the invention is illustrated in FIG. 8. The rocker 96 is mounted for pivoting movement on a shaft 98 corresponding to the shaft 30 in the embodiment of FIGS. 1 to 6. The pivot shaft 98 is mounted at one end on the plate 100, which corresponds to the mounting plate 26. The mounting plate 100 has a screw hole 102 and a slot 104 for receiving the screws which support the mounting plate on the base of the movement. The hook on the end of the Bourdon tube 106 bears against the lower side of the arm 108 to provide a pivoting connection between the hook 82 and the arm 108. Since the tube 106 is mounted on the base that supports the plate 100, swinging of the plate 100 about the screw hole 102 causes the point of contact of the hook to move along the arm toward or away from the pivot axis. The slot 104 in the mounting plate 100 allows rotation of the movement around the screw hole 102, which nominally lies on an axis extending perpendicular to the lower side of the arm 108 when the position of the arm corresponds to the zero scale position of the pointer. Since the band, the rocker and the roller are supported on the plate 100, the relationship between these components does not change, but the change in position of the pivot shaft 98 relative to the tube 106 causes a change in the amplification of the motion of the end of the tube.

Figure 9:
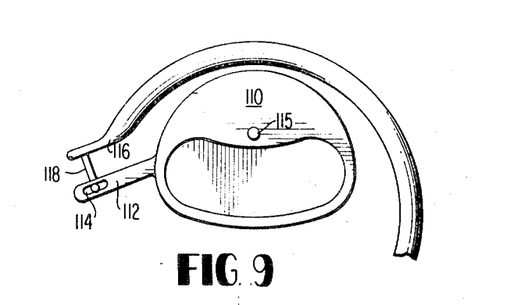
FIG. 9 is a detail elevational view of a third modified form of the gauge showing a slidable connection between the rocker arm and the tube.

Another modified form of the invention is shown in FIG. 9. In this modified form, the components of the movement are substantially identical with those illustrated in FIGS. 1 to 6, except that the rocker 110 has an arm 112 with a longitudinal slot 114. The slot 114 extends substantially radially of the pivot axis 115. The Bourdon tube 116 has a stiff wire 118 projecting outwardly from the end of the tube. The wire is bent into the shape of an L and is received in the slot 114. This connection between the wire 118 and the slot 114 prevents rotation of the arm relative to the tube 116. Adjustment of the position of the wire along the slot can be made by bending the wire 118, thereby providing for adjustment of amplification of the movement.

Figure 10:
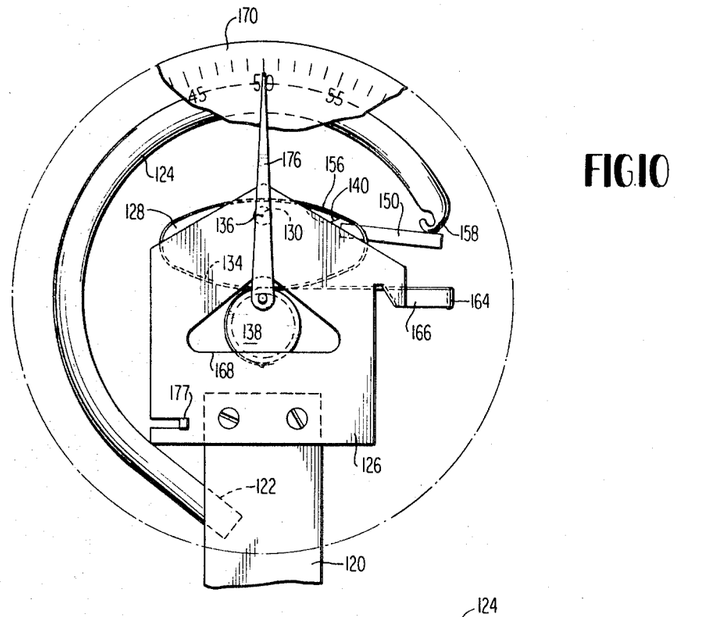
FIG. 10 is a front elevational view of a pressure gauge incorporating another embodiment of this invention.
Figures 11, 12:
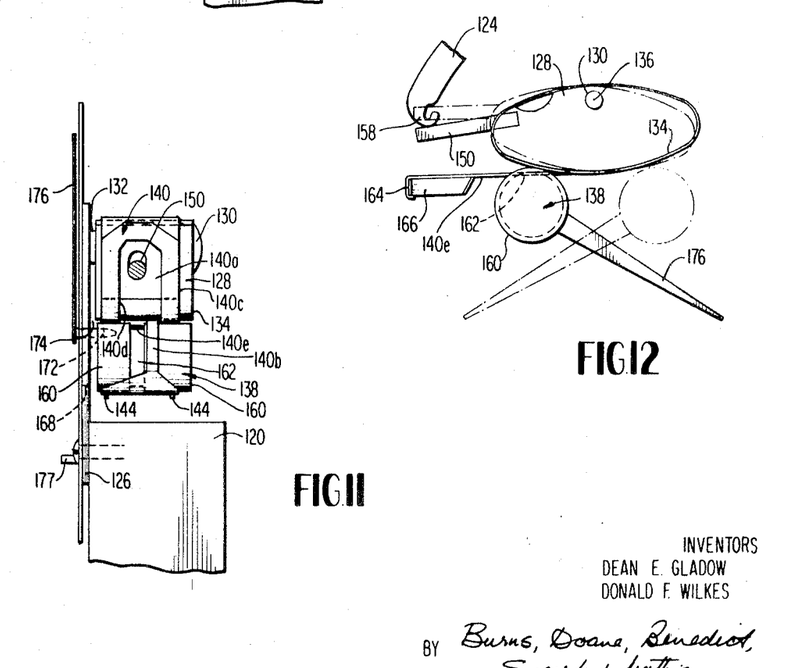
FIG. 11 is a side elevational view of the pressure gauge in FIG. 10.
FIG. 12 is a rear elevational view, partially schematic, of the pressure gauge of FIG. 10.

Another embodiment of this invention is shown in FIGS. 10 to 13. In this embodiment, a conventional base 120 has a socket 122 for receiving and supporting a Bourdon tube 124. The base also supports a mounting plate 126 on the front side of the pressure gauge. As shown in FIGS. 10 and 11, a rocker 128 is pivotally mounted on a shaft 130 projecting rearwardly from the mounting plate 126. Preferably, a spacer 132 is provided between the rocker 128 and the rear surface of the mounting plate 126. The rocker has a cylindrical guide surface 134 that has a radius of curvature which is substantially greater than the shortest distance between the guide surface 134 and the pivot axis 136 of the rocker 128.

Figure 13:
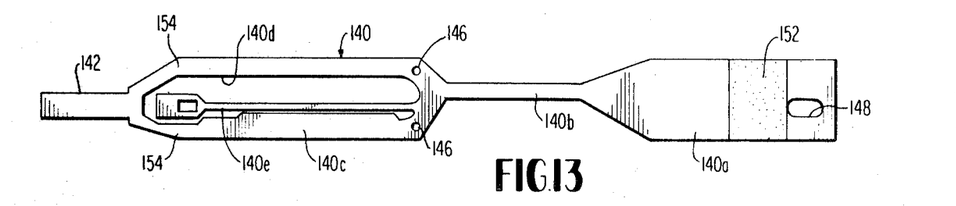
FIG. 13 is a plan view, on a reduced scale, of the band prior to assembly in the pressure gauge of FIG. 10.

A roller 138 is supported on the guide surface 134 by a thin, resiliently flexible band 140. As shown in FIG. 13, the band has a wide end portion 140a, a narrow intermediate portion 140b and a divided portion 140c having a longitudinal slot 140d with a separately movable tongue 140e which is connected with the band at the end of the slot 140d. A tab 142 at the end of the band is used to assemble the band on the rocker and the roller and during assembly is removed. The roller 138 has a pair of projections 144 which are received in corresponding holes 146 in the band and the end of the band 140a has a hole 148 which is assembled over the end of a radial arm 150 on the rocker 128. The band is looped around the roller and around the rocker in a "figure 8", with the end portion 140a extending across the top of the rocker and the end of the divided portion 140c overlapping the end portion 140a. Preferably, the end portion 140a is coated with solder, as indicated at 152 in FIG. 13, and the corresponding area of the divided portion 140c is also coated with solder, as indicated at 154. When the band has been assembled and pulled tight, the ends of the band are quickly joined together by touching the soldered portions with a hot iron. To avoid distortion of the rocker due to the heat during the soldering operation, the underlying portion of the rocker has a transverse groove 156.

The end of the Bourdon tube 124 has a hook 158 that bears against the upper surface of the arm 150, which extends radially of the rocker axis 136. The rocker 128 is biased to rotate in a counterclockwise direction due to the cross-sectional area of the divided portion 140c being greater than the cross-sectional area of the intermediate portion 140b. This bias urges the arm 150 against the hook 158, so that the arm remains in engagement with the hook as the tube 124 expands.

The roller 138 has a pair of cylindrical rolling surfaces 160, which are separated by a circumferential groove 162. As shown in FIG. 10, the bottom of the circumferential groove 162 is substantially cylindrical, but the central axis of the bottom of the groove is offset from the central axis of the rolling surfaces 160. The tongue 140e of the band is at least partially wrapped on the bottom of the groove 162 and extends outwardly to an arm 164 on a bracket 166 which extends outwardly from the mounting plate 126. The end of the tongue is soldered or otherwise secured to the arm 164.

The mounting plate 126 has a central opening 168 and a thin dial plate 170 is applied over the front face of the mounting plate 126 by means of an adhesive or other suitable means. The dial plate 170 has a central opening corresponding to the opening 168 in the mounting plate. The roller 138 has a tapered socket 172 (FIG. 11) to receive a pin 174 projecting rearwardly from the pointer 176. Preferably, as shown in FIG. 10, the socket 172 in the roller is offset from the axis of the roller 138 in the same direction as the central axis of the bottom of the groove 162 is offset, and the pointer 176 also extends along a radius of the roller in the direction of the offset. A zero stop 177 (FIGS. 10 and 11) is bent outward from the mounting plate 126 to limit counterclockwise movement of the pointer 176.

The motion of the rocker and the roller are illustrated schematically in FIG. 12, as viewed from the rear of the instrument. When the Bourdon tube 124 is contracted, the position of the pointer 176, as shown in full lines in FIG. 12, corresponds to the zero position on the scale 170.

As the Bourdon tube 124 expands, the hook 158 moves upwardly as viewed in FIG. 12, allowing the arm 150, which is held against the hook by the spring bias of the band, to swing the rocker in a clockwise direction, as viewed in FIG. 12. This movement of the guide surface 134 is transmitted through the band to the rolling surface 160 on the roller 138. The tongue 140e is wrapped on the bottom of the groove 162. Preferably, the depth of the groove 162 is small to cause the roller to move toward the right as viewed in FIG. 12, a relatively large distance in response to a small angular rotation of the rocker 128. The cross-sectional area of the divided portion 140c of the band is larger than the intermediate portion of the band 140b and consequently the roller 138 is urged to roll toward the right as viewed in FIG. 12. Due to the eccentricity of the bottom of the groove 162, the tongue 140e applies greater amplification at the mid-portion of the travel of the roller 138 than it does at the opposite ends of the path of the roller. This change in amplification compensates for the change in distance between the guide surface 134 and the pivot axis 136. By properly selecting the various sizes of the rolling surfaces, a uniform and linear movement of the pointer 176 can be achieved.

The embodiment of this invention as shown in FIGS. 10 to 13 provides good shock resistance because the roller 138 and the rocker 128 rotate in opposite directions to register a change in the pressure reading. If an impact is applied against the side of the meter case, the inertial movement of the rocker and the roller will tend to cancel each other out, provided the mass of each is approximately the same. Another advantage of causing the rocker and the roller to rotate in opposite directions, is the total displacement of the roller relative to the mounting plate 126 is minimized. This allows the use of a relatively small opening 168 through which the pointer end 174 extends. Furthermore, since the rocker and the roller are entirely supported on the mounting plate 126, the back of the instrument can remain completely exposed for adjustment purposes or to provide a rear mounted gauge in which the pipe connection for the base extends rearwardly from the base 120.

In addition to the adjustments for amplification, zeroing and linearity as described with respect to the embodiment of FIGS. 1 to 9, the embodiment of FIGS. 10 to 13 can be adjusted to expand the scale at the low and high ends of the scale by bending the arm 164 and the bracket 166 up or down from the position shown in FIG. 10. Bending the arm up provides more amplification at the upper end of the scale, while bending the arm down provides greater amplification at the low end of the scale.

Expansion of the midportion of the scale can be obtained by adjusting the degree of offset of the bottom of the groove 162. As the degree of offset increases, the amplification at the mid-portion of the scale increases.

Figure 14:
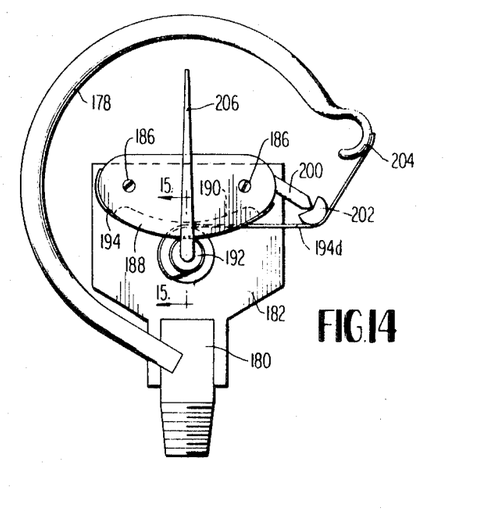
FIG. 14 is a front elevational view, partially schematic, of a pressure gauge incorporating a third embodiment of this invention.
Figure 15:
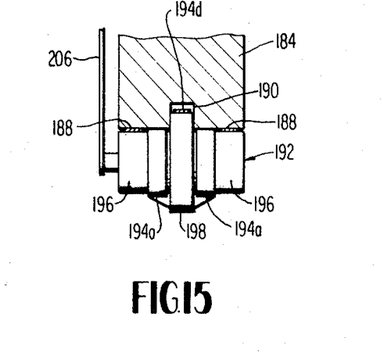
FIG. 15 is a cross-sectional view of the pressure gauge along the line 15—15 in FIG. 14.
Figure 16:
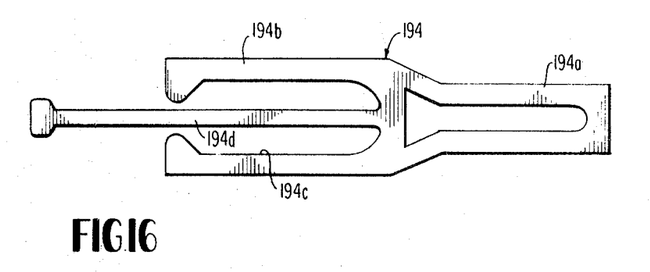
FIG. 16 is a plan view of the band before assembly in the pressure gauge of FIG. 14.

A third embodiment of the invention is illustrated in FIGS. 14 to 16. In this embodiment, a Bourdon tube 178 is supported in a conventional tube socket or base 180. A mounting plate 182 extends upwardly from the rear side of the base 180 and has a block 184 secured on the plate by a pair of screws 186. The block 184 has a cylindrical guide surface 188 and a slot 190 extends longitudinally of the guide surface 188. A roller 192 is supported on the block 184 by a thin, resiliently flexible band 194 which is wrapped around the roller and secured to the block 184 at the opposite ends of the guide surface 188.

As shown in FIG. 16, the band 194 includes a narrow portion 194a and a wide portion 194b, which has a longitudinal slot 194c. A tongue 194d is attached to the band at one end of the slot 194c. The band is secured to the roller by welding or other suitable means at the junction between the narrow portion 194a and the wide portion 194b. Both the narrow portion and the wide portion are wrapped on rolling surfaces 196 of the roller, while the tongue 194d is wrapped on an enlarged diameter portion 198 of the roller. As shown in FIG. 14, the transition between the wide and narrow portions of the band preferably occurs at the lower side of the roller when the roller is approximately midway between opposite ends of its path.

An arm 200 extends outwardly from the block 184 and a rocker 202 is pivotally mounted at the end of the arm. The tongue 194d extends over the outer surface of the rocker and is attached to a hook 204 at the end of the Bourdon tube 178.

A pointer 206 is secured on the end of the roller 192 and the motion of the roller corresponds to the motion of the roller 178 in the embodiment of FIGS. 1 to 9, except that the tongue 194d is displaced longitudinally by the movement of the hook 204, while the block 184 remains stationary. The roller is shown in FIG. 14 at approximately the mid-portion of its path of movement. Further expansion of the Bourdon tube would pull the tongue 194d toward the right, causing the rocker 202 to pivot sufficiently to allow this movement without sliding relative to the rocker. Rotation is imparted by the tongue 194d to the roller 192, causing the roller to roll toward the left as viewed in FIG. 14, thereby swinging the pointer 206 in a clockwise direction. Spring bias in the band urges the roller to return toward the right end of the block 184 as the hook 204 moves downwardly during contraction of the Bourdon tube. Although the center of the roller 192 follows a relatively long path as compared to the movement of the rollers in the other two embodiments previously described, the pressure gauge of this embodiment has the advantage of being relatively simple to construct and assemble.

The meter movement of this invention has many advantages over conventional pressure gauge movements. The components of all three embodiments of this invention are easily manufactured to the required tolerances. The cylindrical guide surface and the cylindrical surfaces on the roller are easily manufactured using conventional fabrication techniques. The shapes are conventional and do not require any unusual tooling. Such critical dimensions as there are in the system are confined to the band, which can be formed to a high degree of accuracy by chemical etching techniques. Since there are fewer parts and the dimensions are less critical, movements in accordance with this invention may be manufactured more efficiently and at a lower cost.

Another important advantage is that the components of the pressure gauge movement move relative to each other with almost a total absence of sliding. Sliding occurs at the pivot shaft 30, but the angular movement of the rocker 32 is so small that frictional resistance to movement is not significant. As a result the movement accurately responds to the expansion and contraction of the tube 18. Even small changes in pressure are recorded because very small changes in the shape of the tube 18 provide sufficient torque for pivoting the rocker.

Since the rocker and the roller are held together tightly by the band and the arm directly engages the tube 18, there is no lost motion between the tube and the pointer. Also, the firmness with which the components are held together by the band makes the pressure gauge resistant to damage from vibration.

While this invention has been illustrated and described in a preferred embodiment, it is recognized that variations and changes may be made therein without departing from the invention as claimed.

What is claimed is:

1. Motion amplifying apparatus comprising:
    base means having a convexly curved guide surface,
    a roller having first and second rolling surfaces of different diameters, band means, said band means supporting said roller for rolling on said first rolling surface along said guide surface, said roller being displaced relative to said base means while rolling along said guide surface and having a pointer extending radially from said roller, said band means including a tongue extending outwardly from said second rolling surface, said band means including means for biasing said roller in one direction along said guide surface, and
    input means for selectively effecting relative movement between said tongue and said guide surface, said band means and said guide surface cooperating to roll said roller along said guide surface a predetermined distance in response to said relative movement by said input means whereby said pointer swings through a predetermined angle in response to operation of said input means.

2. Motion amplifying apparatus according to claim 1 wherein said guide surface coincides with at least an arc of a circle, said first rolling surface having a smaller radius than the radius of said guide surface arc, said second rolling surface being offset axially from said first rolling surface.

3. Motion amplifying apparatus according to claim 2, wherein said guide surface means includes a rocker mounted for pivoting about an axis parallel to the central axis of said roller, said pivot axis being spaced from said guide surface a distance less than the radius of said guide surface arc.

4. Motion amplifying apparatus according to claim 3 wherein said input means includes means holding a portion of said band tongue fixed relative to said pivot axis, and includes lever means on said rocker, whereby swinging of said rocker by said lever means causes said roller to be displaced along said guide surface.

5. Motion amplifying apparatus according to claim 4 including means for adjusting the degree of amplification and the linearity of amplification.

6. Motion amplifying apparatus according to claim 2 wherein said base means has a longitudinal groove extending along said guide surface, said second rolling surface being received in said groove, said input means including a tongue bearing member on said base means and aligned with said groove, said tongue extending through said groove between said second rolling surface and said bearing member.

7. Motion amplifying apparatus according to claim 6 wherein said band means is in the form of an elongated thin strip of resiliently flexible material, said biasing means being provided by a difference in cross-sectional area between longitudinally spaced portions of said band, said tongue being integral with said strip.

8. Motion amplifying apparatus according to claim 6 wherein said input means includes means for displacing said tongue longitudinally relative to said base means, said bearing member being movable with said tongue to avoid sliding between said tongue and said member.

9. Motion amplifying apparatus comprising:
    a base,
    rocker means on said base having a convexly curved guide surface, said rocker means being supported for pivoting about an axis relative to said base,
    a roller,
    band means supporting said roller for rolling along said guide surface, said roller being displaced relative to said base while rolling along said guide surface, said roller having a pointer extending radially from said roller, said band means including a tongue extending outwardly from said roller,
    means for supporting a portion of said tongue at a selected position relative to said rocker means axis, whereby rotation of said rocker means about said axis imparts amplified rotation of said pointer relative to said pivot axis.

10. Motion amplifying apparatus according to claim 9 wherein said roller has a substantially cylindrical rolling surface and a tongue supporting surface, the distance between at least a portion of said tongue supporting surface and the central axis of said rolling surface being different from the radius of said rolling surface.

11. Motion amplifying apparatus according to claim 10 wherein the distance between said tongue supporting surface and the center of said rolling surface varies around the circumference of said tongue supporting surface.

12. Motion amplifying apparatus according to claim 9 wherein said rocker means includes an arm extending radially with respect to said pivot axis, and means for connecting said rocker arm with a movable member at a selected distance from said pivot axis, whereby displacement of said movable member is amplified and recorded by movement of said pointer, and adjustment of the degree of amplification is made by changing said selected distance.

13. Motion amplifying apparatus according to claim 9 wherein said guide surface has a radius substantially greater than the shortest distance between said pivot axis and said guide surface, said pivot axis being substantially parallel to the central axis of said roller, and said guide surface radius being greater than the radius of said roller.

14. Motion amplifying apparatus according to claim 13 wherein said roller has a tongue supporting surface, the distance between said tongue supporting surface and the central axis of said roller being shorter than the radius of said roller, and spring means biasing said roller away from said tongue supporting means.

15. Motion amplifying apparatus according to claim 14 wherein said band means includes a thin resiliently flexible band extending continuously around said rocker and around said roller, and including means preventing longitudinal displacement of said band relative to said guide surface and said roller surface, said spring means being integral with said band.

16. A mechanical movement for providing amplified rotary motion in response to input motion comprising:
    base means,
    rocker means, means mounting said rocker means on said base means for pivoting motions about an axis, said rocker means having a convex guide surface spaced from said axis,
    a roller, said roller having a substantially cylindrical rolling section and a tongue supporting section,
    an elongated flexible band encircling said rolling section and projecting outwardly from said roller in opposite directions on said rocker means, said roller being supported on said rocker means by said band, allowing said roller to roll along said guide surface while being displaced relative to said base, said band including a tongue extending outwardly from said tongue supporting section, means holding a portion of said tongue fixed relative to said rocker means axis, means for transmitting said input motion to said rocker means in the direction of rotating said rocker means about said pivot axis, whereby pivoting of said rocker means by said input means about said pivot axis causes said roller to roll along said guide surface with an amplified angular displacement.

17. The mechanical movement according to claim 16 wherein portions of said band are superimposed on said guide surface, said band portions being between said rolling section and said guide surface as said roller moves along said guide surface, whereby foreign particles do not interfere with the movement of said roller.

18. The mechanical movement according to claim 16 wherein said tongue holding means includes a mounting plate, said tongue being secured on a bracket extending outwardly from said mounting plate, and said rocker means being supported on said mounting plate for pivoting about said axis relative to said mounting plate.

19. The mechanical movement according to claim 16 wherein said rocker mounting means includes a pivot shaft on said mounting plate, said guide surface including at least a sector of a cylinder and having a radius that is greater than the radius of said rolling section.

20. The mechanical movement according to claim 19 wherein said tongue supporting section is substantially cylindrical and has a diameter that is smaller than the diameter of said rolling section, said roller being movable relative to said guide surface in a direction opposite to the direction of rotation of said rocker means, whereby said mechanical movement resists lateral impact and provides a high degree of amplification.

21. In a Bourdon tube pressure gauge of the type having a base and means for transmitting motion of said tube to a pointer movable across a circular scale, the improvement comprising:
guide means having a convexly curved guide surface, said guide means being mounted on said base,
a roller, said roller having a substantially cylindrical rolling surface and a drive surface of a different diameter,
tensioned band means supporting said roller for rolling along said guide surface, said roller being displaced relative to said base while rolling along said guide surface,
spring means biasing said roller to move in one direction along the guide surface,
drive means for changing the tension in at least a portion of said band means to cause rolling of said roller along said guide surface in the opposite direction in response to motion of the free end of said tube, said band portion being supported on said roller drive surface, said pointer being secured on said roller and extending radially of said roller, whereby expansion and contraction of said tube causes said roller to move along said guide surface, thereby swinging said pointer across said circular scale.

22. The pressure gauge according to claim 21 wherein said band portion includes a tongue projecting outwardly from said roller, and said drive means includes means connecting said band tongue with a portion of said tube, whereby expansion and contraction of said tube is transmitted to said roller through said tongue.

23. The pressure gauge according to claim 22 wherein said convexly curved guide surface has the shape of at least a sector of a cylinder and remains substantially fixed with respect to said tube.

24. The pressure gauge according to claim 21 wherein said guide means includes a rocker and includes means mounting said rocker for pivoting about an axis, said guide surface being on said rocker and having a center of curvature substantially parallel to said rocker pivot axis, said band portion including a tongue projecting outwardly from said roller, said drive means including means holding a portion of said band tongue fixed relative to said pivot axis and said drive means including means connecting said rocker with said tube, whereby expansion and contraction of said tube pivots said rocker and causes said roller to move along said guide surface.

25. The pressure gauge according to claim 24 wherein said rocker has an arm extending radially with respect to said pivot axis, and said connecting means includes means on said tube bearing against said arm at a selected distance from said pivot axis, whereby the amplification of the motion transmitting means can be adjusted by changing the distance from the pivot axis to the point at which the tube bears against the arm.

26. The pressure gauge according to claim 24 wherein said roller includes a substantially cylindrical tongue supporting section, said tongue supporting section having a different diameter from that of the rolling surface, said guide surface including at least a sector of a cylinder, the radius of curvature of said guide surface being substantially greater than the radius of said rolling surface, whereby a small degree of rotation of said rocker about said pivot axis produces a large angular rotation of said roller.

27. The pressure gauge according to claim 26 wherein said tongue supporting surface has a radius greater than the radius of said rolling surface and said tongue mounting means is located in substantial alignment with the direction of movement of said roller along said guide surface, said rocker includes an arm extending radially with respect to said pivot axis, said tube being in engagement with said arm, whereby rotation of said rocker about said pivot axis in one direction causes said roller to move away from said tongue holding means.

28. The pressure gauge according to claim 26 wherein said tongue supporting surface has a radius smaller than the radius of said rolling surface, said tongue holding means being substantially aligned with direction of movement of said roller along said surface, the central axis of said tongue supporting surface is offset from the central axis of said rolling surface, whereby the angle of intersection of said tongue surface with said tongue varies as the roller rolls along said guide surface.

29. In a Bourdon tube pressure gauge of the type having means for transmitting motion of said tube to a pointer movable across a circular scale, the improvement comprising:
means having a convexly curved guide surface,
a roller, said roller having a substantially cylindrical rolling surface,
band means supporting said roller for rolling along said guide surface, said band means including a thin resiliently flexible band extending along said guide surface and said roller being supported within a loop of said band, said band having a tongue extending outwardly from said roller,
means for rolling said roller along said guide surface in response to motion of said tube,
said rolling means including means connected with said tongue for displacing said roller along said guide surface in response to expansion and contraction of said tube,
said pointer being secured on said roller and extending radially of said roller, whereby expansion and contraction of said tube cases said roller to move along said guide surface, thereby swinging said pointer across said circular scale.

30. The pressure gauge according to claim 29 wherein said guide surface means includes a body having a surface extending around the perimeter thereof, said convexly curved guide surface being on the perimeter of said body, said band being looped around the perimeter of said body and being tensioned for continuously urging said roller toward said guide surface.

31. The pressure gauge according to claim 29 wherein said band includes integral means for biasing said roller to roll in a predetermined direction along said guide surface.

32. A method for providing an amplified indication on a substantially circular scale by movement of a pointer across said scale in response to an input motion said method comprising:

supporting a roller on a cylindrical guide surface having a radius of curvature substantially larger than the radius of the roller, wrapping a flexible band around at least a portion of said roller on a band supporting surface having a radius of curvature different from the radius of said roller, maintaining a portion of said band at a predetermined position spaced from said guide surface and substantially aligned with the path of said roller, and pulling said band longitudinally, whereby said band imparts amplified movement to the roller and thereby swinging the pointer across said circular scale while the central axis of the roller moves along a circular path about the center of curvature of the guide surface.

33. The method according to claim 32 wherein said pulling step includes pivoting said guide surface about said pivot axis in response to said input motion, and transmitting rotation of said guide surface to said roller without slipping.

References Cited
UNITED STATES PATENTS

| | | | |
|---|---|---|---|
| 3,204,472 | 9/1965 | Gorgens et al. | 74—89.2 |
| 3,373,619 | 3/1968 | Tate et al. | 74—89.2 |
| 2,930,235 | 3/1960 | Oppenheim | 73—411 |
| 3,346,830 | 10/1967 | Ankeny | 73—411 |

WILLIAM F. O'DEA, Primary Examiner

W. S. RATLIFF, JR., Assistant Examiner